United States Patent
Low et al.

(10) Patent No.: US 10,925,056 B2
(45) Date of Patent: Feb. 16, 2021

(54) MULTIMODE DEVICE PRIORITY ACCESS MANAGEMENT

(71) Applicant: Intel Corporation, Santa Clara, CA (US)

(72) Inventors: Su-Lin Low, San Diego, CA (US); Hong-Kui Yang, San Diego, CA (US); Jing Su, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 68 days.

(21) Appl. No.: 16/023,278

(22) Filed: Jun. 29, 2018

(65) Prior Publication Data

US 2020/0008196 A1    Jan. 2, 2020

(51) Int. Cl.
*H04W 72/04* (2009.01)
*H04W 84/04* (2009.01)
*H04W 72/10* (2009.01)

(52) U.S. Cl.
CPC ........ *H04W 72/0453* (2013.01); *H04W 72/10* (2013.01); *H04W 84/042* (2013.01)

(58) Field of Classification Search
CPC ............. H04W 72/0453; H04W 72/10; H04W 84/042; H04W 60/00; H04W 60/005; H04W 88/06
See application file for complete search history.

(56) References Cited

U.S. PATENT DOCUMENTS

| | | | |
|---|---|---|---|
| 8,107,954 B2 | 1/2012 | Islam et al. | |
| 8,238,980 B1* | 8/2012 | Shusterman | H04W 52/0251 455/574 |
| 8,750,178 B2 | 6/2014 | Wietfeldt et al. | |
| 8,929,891 B2* | 1/2015 | Wu | H04W 48/18 455/432.1 |
| 9,338,805 B2* | 5/2016 | Cheng | H04W 76/10 |
| 9,521,563 B2* | 12/2016 | Su | H04W 24/02 |
| 9,560,656 B2* | 1/2017 | Damnjanovic | H04W 72/048 |
| 9,572,174 B2* | 2/2017 | Chen | H04W 72/1215 |
| 9,706,583 B1* | 7/2017 | Pawar | H04W 88/04 |
| 9,712,973 B2 | 7/2017 | Shih et al. | |
| 9,780,822 B2* | 10/2017 | Krishnamoorthi | H04W 72/042 |
| 2011/0280166 A1 | 11/2011 | Nien et al. | |
| 2012/0322504 A1 | 12/2012 | Chou et al. | |
| 2012/0327790 A1 | 12/2012 | Lee et al. | |
| 2013/0329639 A1 | 12/2013 | Wietfeldt et al. | |
| 2015/0023217 A1 | 1/2015 | Hu et al. | |

(Continued)

FOREIGN PATENT DOCUMENTS

WO    2016191916 A1    12/2016

*Primary Examiner* — Huy D Vu
*Assistant Examiner* — Bailor C. Hsu
(74) *Attorney, Agent, or Firm* — Schiff Hardin LLP

(57) ABSTRACT

A SRLTE/Hybrid CDMA management system is provided to facilitate the prioritization and management of shared RF resources among the different SIMs and RATs in a multi-mode device. The described techniques address a shared single RF resource usage problem in multi-SIM and multi-mode 3GPP2/3GPP devices that implement an SRLTE or Hybrid CDMA mode in one or more SIMs. Thus, the techniques enable the RATs within an SRLTE or Hybrid CDMA system, and RATs across multiple SIMs, to access a single set of RF resources using a priority access scheme that prioritizes RATs for both packet service (PS) and circuit service (CS).

24 Claims, 6 Drawing Sheets

(56) References Cited

U.S. PATENT DOCUMENTS

| | | |
|---|---|---|
| 2015/0065106 A1 | 3/2015 | Catovic et al. |
| 2015/0119103 A1* | 4/2015 | Ngai .................... H04W 48/18 |
| | | 455/552.1 |
| 2015/0237497 A1 | 8/2015 | Chen et al. |
| 2015/0245309 A1 | 8/2015 | Nayak et al. |
| 2015/0296520 A1* | 10/2015 | Batchu ............. H04W 72/0493 |
| | | 455/434 |
| 2016/0095151 A1 | 3/2016 | Chuttani et al. |
| 2016/0135213 A1 | 5/2016 | Zhu et al. |
| 2016/0366626 A1 | 12/2016 | Krishnamoorthy et al. |

* cited by examiner

MULTIMODE DEVICE PRIORITY ACCESS MANAGEMENT

TECHNICAL FIELD

Aspects described herein generally relate to multi-SIM and multi-RAT devices and, more particularly, to multi-SIM and multi-RAT devices that utilize priority schemes to implement Single-Radio Long Term Evolution (SRLTE) and hybrid Code-Division Multiple Access (CDMA) modes.

BACKGROUND

Wireless multimode devices are configured to utilize different wireless networks, or radio access technologies (RATs). Such multimode devices may ensure that wireless network connectivity is maintained as the device moves through a particular area by switching from one RAT to another. To accomplish this, many multimode devices implement subscriber identify modules (SIMs), which securely store the user identify information such as the International Mobile Subscriber Identity (IMSI), authentication and security keys, and the network information that determines how the device should scan, acquire, and select a particular network, as well as the priority of each type of network access.

In a single SIM 3rd Generation Partnership Project 2 (3GPP2) and 3GPP multimode device, a SRLTE mode may be deployed when the LTE system does not provide Voice over LTE (VoLTE) services. Such systems generally utilize LTE or data only (DO) RATs for Packet Service (PS), and a CDMA 1×RAT for Circuit Service (CS). When the device loses LTE coverage and is handed over to DO, such devices operate under a hybrid CDMA mode which includes CDMA DO as PS and 1× as CS.

Multimode devices, on the other hand, use one or more SIMs, with each SIM being associated with a list of allowed RATs, and an active operating RAT being selected according to carrier requirements and the current coverage area. Such multi-SIM systems generally include 3GPP RATs, or at most a CDMA 1×RAT. Thus, the introduction of SRLTE and hybrid CDMA mode into a multi-SIM system creates challenges regarding RF resource usage when only a single RF resource set is available, as an SRLTE or hybrid CDMA system comprises 2 active RATs operating concurrently to provide PS and CS services within the same SIM.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, the introduction of SRLTE and Hybrid CDMA mode into devices that utilize multiple SIMs poses a challenge to prioritize and manage shared RF resources among the different SIMs and RATs. The present aspects are directed to a solution that addresses the shared single RF resource usage problem in multi-SIM and multimode 3GPP2/3GPP devices that implement SRLTE/Hybrid CDMA mode in one or more SIMs. The aspects described herein enable the RATs within the SRLTE/Hybrid CDMA system and RATs across multiple SIMs to access a single set of RF resources (e.g., one or more transceivers and their corresponding antennas) using a priority access scheme that prioritizes RATs to achieve the best overall system performance and user experience for both PS and CS. As further described below, the aspects advantageously provide a system in which little or no missed 1× CS pages and calls occur, and at the same time facilitate excellent packet data coverage to be maintained with little or no connectivity loss.

Figure 1:
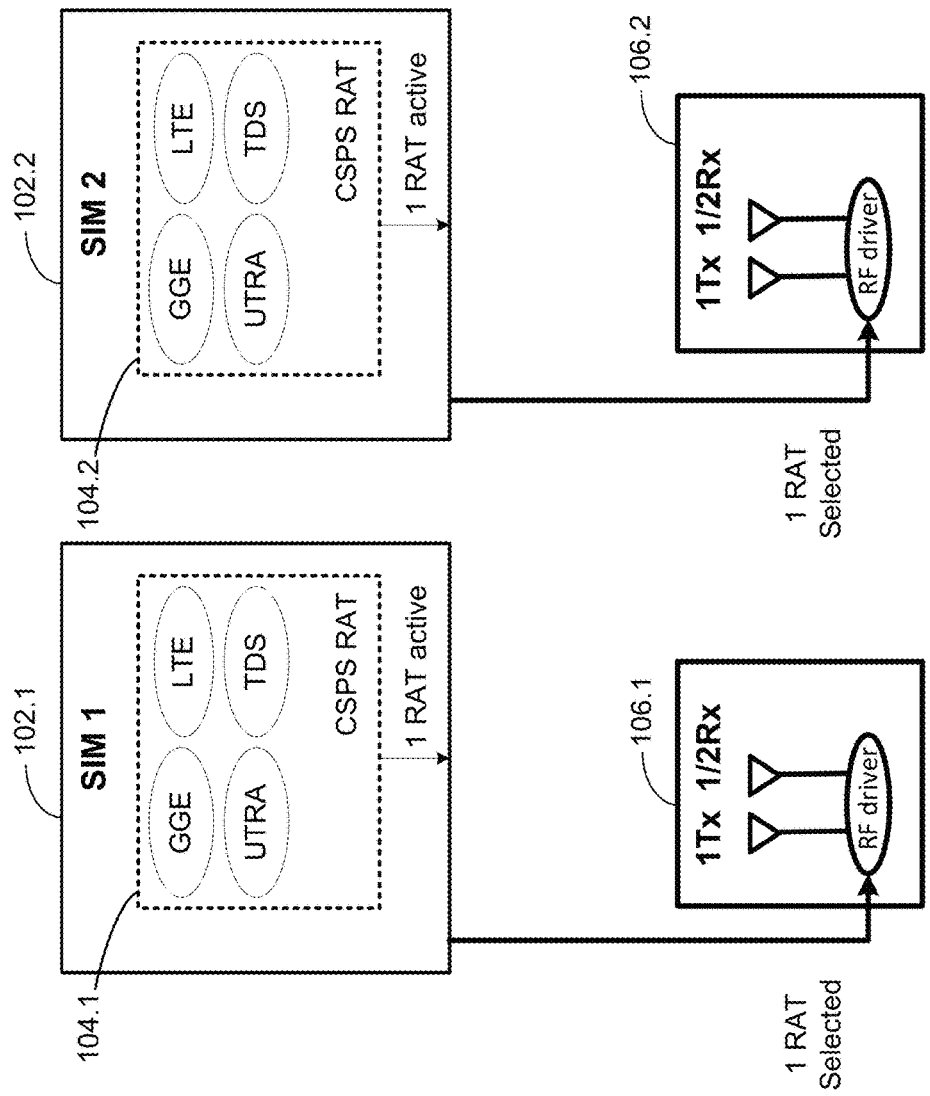
FIG. 1 illustrates a block diagram of a typical multi-SIM and multi RAT device with separate RF resources.

FIG. 1 illustrates a block diagram of a typical multi-SIM and multi RAT device with separate RF resources. As shown in FIG. 1, a wireless device 100 includes two separate SIM cards 102.1, 102.2, each being associated with respective RAT sets 104.1, 104.2. Each of SIMs 102.1, 102.2, and their respective RAT sets 104.1, 104.2, is further associated with a separate respective RF resource set 106.1, 106.2.

As further discussed with reference to FIG. 1 and elsewhere herein, 3GPP2 CDMA systems may include, for example, 1× Circuit Switch (1λ), Data-Only (DO), or High Rate Packet Data (HRPD), and Enhanced High Rate Packet Data (EHRPD) technologies. 3GPP systems may include, for example, LTE, Universal Terrestrial Radio Access (UTRA), Time Division Synchronous CDMA (TDS) and GSM, GPRS, and EDGE Radio Access Network (GGE). Thus, as shown in FIG. 1, each of the RAT sets 104.1, 104.2 is considered a CS and PS (CSPS) RAT set, and each of RAT sets 104.1, 104.2 includes the aforementioned GGE, LTE, UTRA, and TDS RATs.

The RF resource sets 106.1, 106.2 may include, for example, RF driver circuitry, which is coupled to two antennas. The RF driver circuitry may include circuitry and/or processors typically associated with device transceivers, and thus include, for example, an analog front end including modulators, demodulators, mixers, amplifiers, filters, etc. In the configuration shown in FIG. 1, the RF driver circuitry for each of shared resource sets 106.1, 106.2, is coupled to two antennas, which may include a transmit antenna (1 TX) and at least one receive antenna (½ RX), depending on the particular operating mode and RAT that is utilized by the device 100 at any particular time.

The device 100 as shown in FIG. 1 can thus allow 1 active RAT associated with each of SIMs 102.1, 102.2 to concurrently operate independently of one another, with each selected RAT from within RAT sets 104.1, 104.2 having exclusive access to its respective RF resource 106.1, 106.2. This technique is simple but not cost effective, and may further lead to band conflicts (e.g., via self-interference due to a transmitted signal on one of RF resources 106.1, 106.2). Therefore, the device 100 may attempt to mitigate such interference by silencing (i.e., deactivating) one of the selected RATs temporarily for a duration of time, and thus adds complexity to a scheduler implemented via the device 100. For example, if band conflicts exists among the RATs in each SIM, only 1 can be allowed to transmit or receive at a time, requiring sophisticated detection, scheduling, and avoidance or silencing schemes.

More generally, the technique implemented via device 100, which implements separate RF resources 106.1, 106.2, has other drawbacks. For instance, device 100 does not consider SRLTE/Hybrid CDMA as a RAT in any SIM, as the addition of SRLTE/Hybrid CDMA to one of the SIMs would introduce additional complexities with a RF conflict resolution entity that needs to schedule resource usage among LTE, DO, and 1× within the same SIM. Additionally, the separate, dedicated RF resource pools for each of SIMs 102.1, 102.2 is inflexible, un-scalable, expensive, and wastes available design space. This technique is also universal or reusable for all reference phone customers or carriers throughout the world, who may require a consolidated single RF resource.

Figure 2:
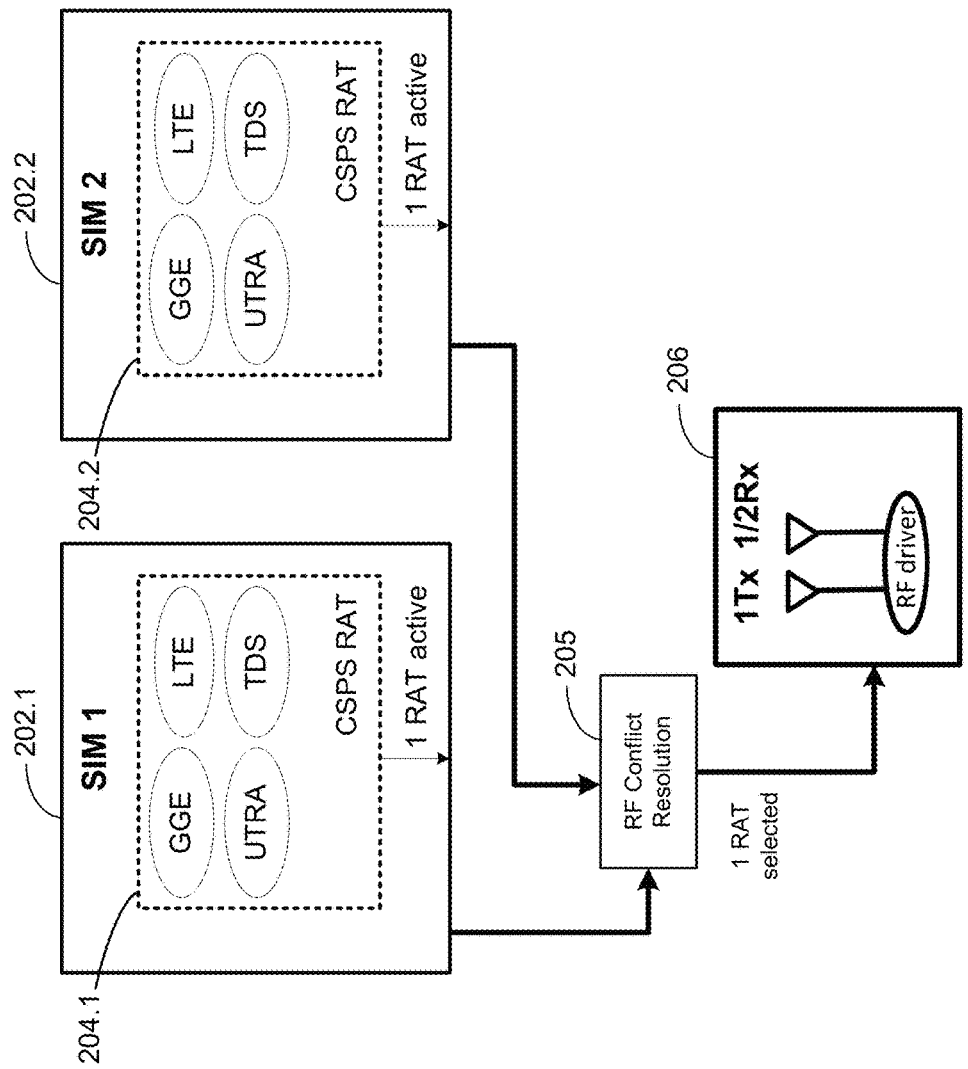
FIG. 2 illustrates a block diagram of a typical multi-SIM and multi RAT device with a shared RF resource.

FIG. 2 illustrates a block diagram of a typical multi-SIM and multi RAT device with a shared RF resource. As shown in FIG. 2, a wireless device 200 includes two separate SIM cards 202.1, 202.2, each being associated with respective RAT sets 204.1, 204.2. However, in contrast to the device 100 as shown in FIG. 1, SIMs 202.1, 202.2, and their respective RAT sets 204.1, 204.2, share a single RF resource set 206. To do so, device 200 implements an RF conflict resolution block 205 to schedule equal priority access among the RATs included in RAT sets 204.1, 204.2 in both of SIMs 202.1, 202.2, as it is not known whether a PS or CS service will be triggered first.

However, the design 200, which implements a shared RF resource for different RATs and SIMs, also has several disadvantages. In particular, this technique ensures that each SIM only allows 1 active RAT at one time, with all other RATs in the SIM being deactivated. Moreover, the technique implemented via device 200 also fails to consider SRLTE/Hybrid CDMA as a RAT in any SIM, as doing so would introduce a non-optimal user experience. Specifically, no differentiation is performed between CS or PS services within the SRLTE/Hybrid CDMA RATs, and therefore CDMA 1× CS may be dropped due to a PS RAT in another SIM, or may otherwise result in undesirable missed 1× pages while packet data service is ongoing. Furthermore, because the RF conflict resolution block 205 considers all RATs across all SIMs with equal priority of access, as each RAT is capable of either CS or PS. As a result, even assuming that SRLTE/Hybrid CDMA mode could be added, doing so would significantly increase the rate in which voice calls are missed or dropped, thus degrading the overall system performance.

Figure 3:
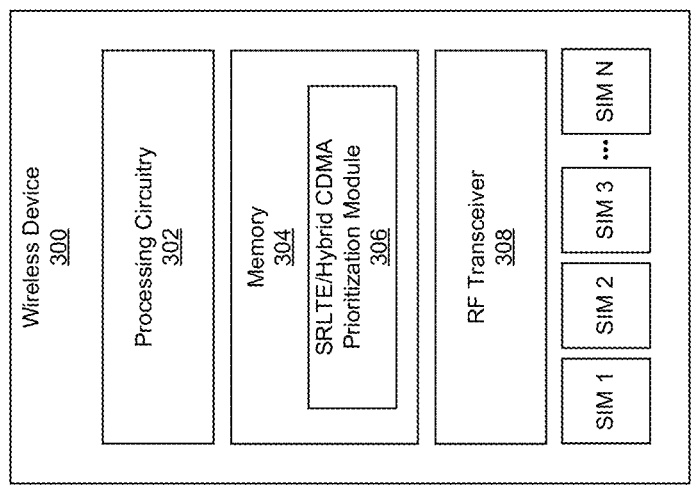
FIG. 3 illustrates a block diagram of a multi-SIM and multi RAT device with a shared RF resource, in accordance with an aspect of the present disclosure.

FIG. 3 illustrates a block diagram of a multi-SIM and multi RAT device with a shared RF resource, in accordance with an aspect of the present disclosure. In various aspects, wireless device 300 may be implemented as any suitable type of device configured to transmit and/or receive wireless signals in accordance with any suitable number and/or type of communication protocols. For instance, wireless device 300 may be implemented as a user equipment (UE) such as a mobile phone, tablet, laptop computer, etc.

In an aspect, the wireless device 300 may include processor circuitry 302, a memory 304, RF transceiver circuitry 308, and any suitable number N of SIMs 1-N. The components shown in FIG. 3 are provided for ease of explanation, and aspects include wireless device 300 including additional, less, or alternative components as those shown in FIG. 3. For example, wireless device 300 may include one or more power sources, display interfaces, peripheral devices, etc.

In an aspect, the various components of wireless device 300 may be identified with functionality further described herein with reference to the prioritization of the SIMs 1-N and the RATs used in accordance with each of these SIMs at any given time. For example, the wireless device 300 may be configured to resolve conflicts among different SIMs and RATs based upon an operational mode (i.e., substate) of each of SIMs 1-N, which is dependent upon the particular RAT used by each of SIMs 1-N at any particular time.

To do so, processor circuitry 302 may be configured as any suitable number and/or type of computer processors, which may facilitate control of the wireless device 300 as discussed herein. Thus, aspects include the processor circuitry 302 being configured to carry out instructions to perform arithmetical, logical, and/or input/output (I/O) operations, and/or to control the operation of one or more components of the wireless device 300. For example, the processor circuitry 302 can include one or more microprocessors, memory registers, buffers, clocks, etc. Moreover, processor circuitry 302 can communicate with and control functions associated with the memory 304, the RF transceiver 308, and/or the SIMs 1-N. This may include, for example, controlling and/or arbitrating transmit and/or receive functions of the wireless device 300, performing one or more baseband processing functions (e.g., media access control (MAC), encoding/decoding, modulation/demodulation, data symbol mapping, error correction, etc.).

In an aspect, the memory 304 stores data and/or instructions such that, when the instructions are executed by the processor circuitry 302, the processor circuitry 302 performs the various functions described herein. The memory 304 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 304 can be non-removable, removable, or a combination of both.

Figure 4:
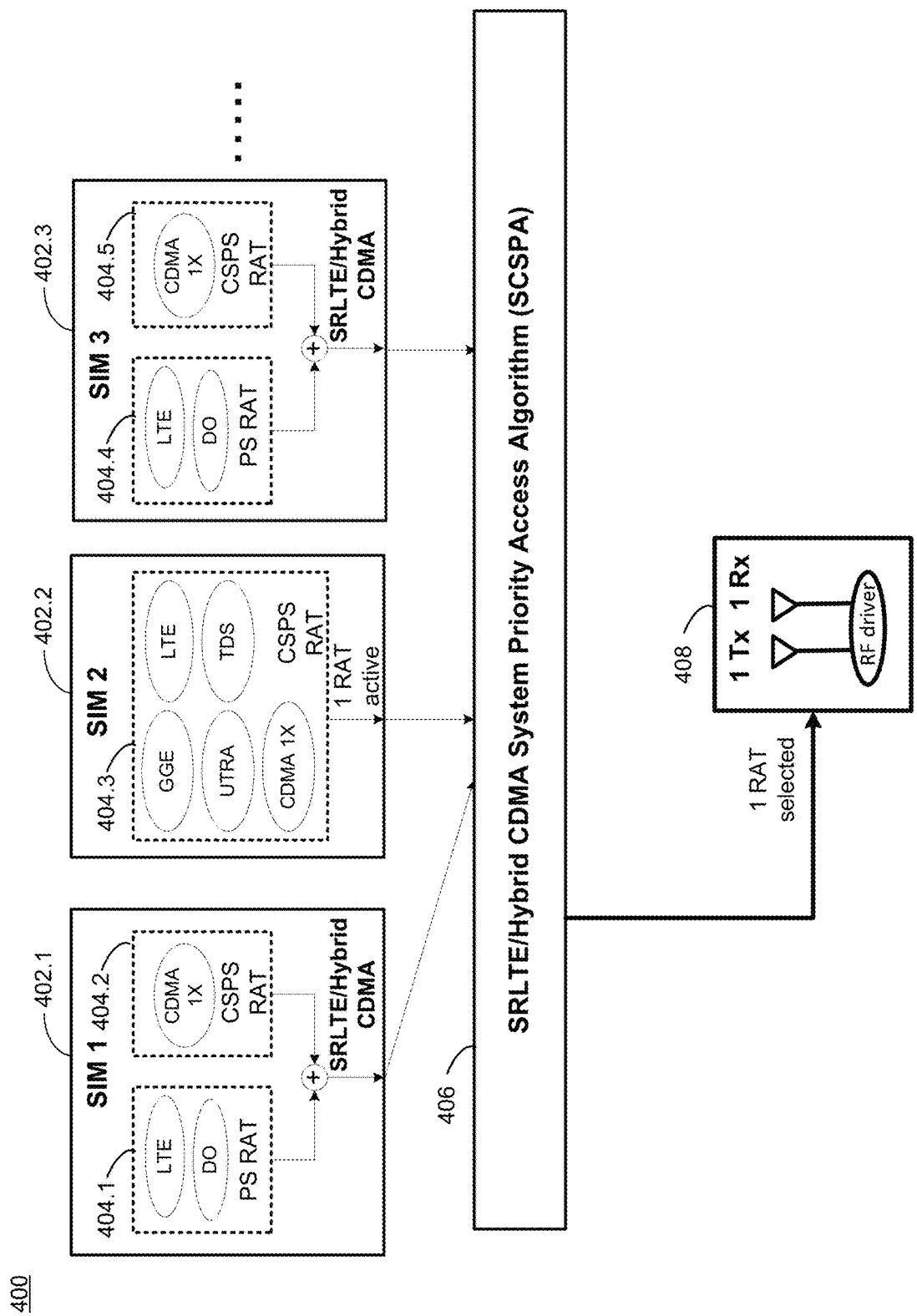
FIG. 4 illustrates a flow associated with a multi-SIM and multi RAT device with a shared RF resource, in accordance with an aspect of the present disclosure.
Figure 5:
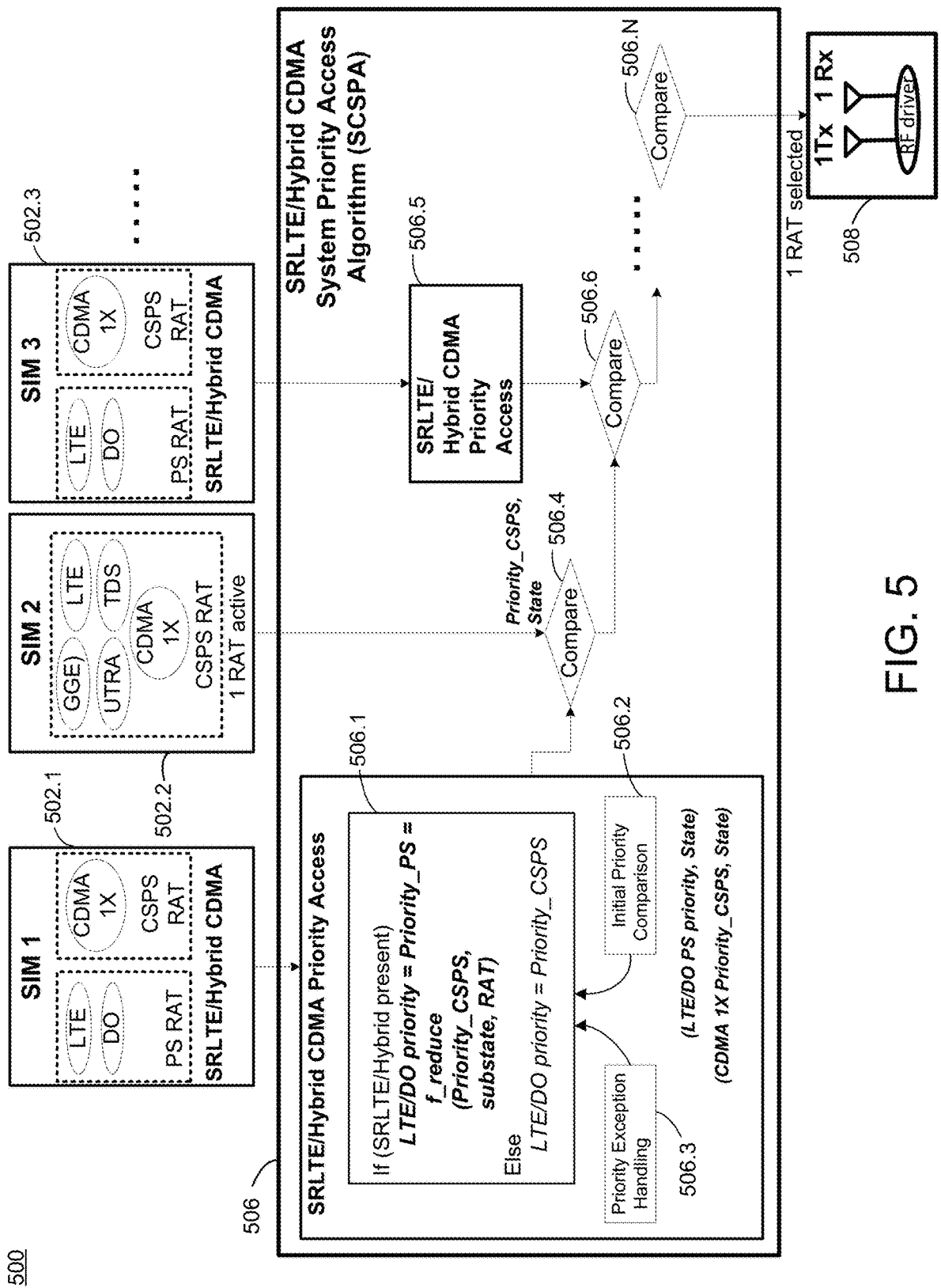
FIG. 5 illustrates a flow associated with a multi-SIM and multi RAT device with a shared RF resource implementing priority handling, in accordance with an aspect of the present disclosure.

For example, the memory 304 may be implemented as a non-transitory computer readable medium storing one or more executable instructions such as, for example, logic, algorithms, code, etc., which is represented as the SRLTE/Hybrid CDMA prioritization module 306. In an aspect, the executable instructions stored SRLTE/Hybrid CDMA prioritization module 306 may be identified with the SRLTE/Hybrid CDMA System Priority Access Algorithm (SCSPA)

blocks 406 and 506, as shown in FIGS. 4-5, and further discussed below. Thus, the processor circuitry 302 may execute the executable instructions stored SRLTE/Hybrid CDMA prioritization module 306 to perform the various functions associated with the SCSPA algorithm as further discussed herein.

In an aspect, the RF transceiver circuitry 308 may facilitate the wireless device 300 supporting communications via any suitable number and/or type of communication protocols. To do so, the RF transceiver circuitry 308 may also include processor circuitry that is configured to transmit and/or receive wireless communications via one or more RATs. For example, the RF transceiver circuitry 308 can include one or more transmitters, receivers, and/or antennas configured to transmit and receive wireless signals. Aspects include the RF transceiver circuitry 308 including any suitable number and/or type of components to facilitate such functionality, such as RF drivers, digital signal processors (DSPs), modulators and/or demodulators, digital-to-analog converters (DACs) and/or an analog-to-digital converters (ADCs), frequency converters (including mixers, local oscillators), filters, etc., to provide some examples.

Each of SIMs 1-N includes data that allows the wireless device 300 (e.g., via the processor circuitry 302) to determine how the wireless device 300 should scan, acquire, and select a particular wireless network. In an aspect, the RF transceiver circuitry 308 may be identified with a shared RF resource as further discussed herein (e.g., the single RF resource sets 408, 508, as shown in FIGS. 4 and 5). In accordance with such aspects, the RF transceiver circuitry 308 represents a single RF resource that is utilized by one of the SIMs 1-N at any particular period of time in accordance with a particular RAT associated with that respective SIM. As further discussed below, because the RF transceiver circuitry 308 is shared among each of the SIMs 1-N in this manner, the use of SRLTE/Hybrid CDMA RATs in some of the SIMs 1-N introduces prioritization complexities that need to be addressed to ensure that the RF transceiver circuitry 308 is appropriately arbitrated. In particular, the aspects described herein allow the wireless device 300 to resolve conflicts between SIMs and RATs requiring access to the RF transceiver circuitry 308 at the same time by implementing a substate-based prioritization scheme among each of the SIMs 1-N and their respective RATs.

FIG. 4 illustrates a flow associated with a multi-SIM and multi RAT device with a shared RF resource, in accordance with an aspect of the present disclosure. As shown in FIG. 4, the flow 400 may be associated with a wireless device that includes any suitable number N of SIMs 402.1-402.N, which may be identified with the SIMs 1-N of the wireless device 300, as shown and described with reference to FIG. 3. For purposes of brevity and ease of explanation, three SIMs 402.1-402.3 are shown in FIG. 4, although the aspects described here are applicable to any suitable number of SIMs. Each of SIMs 402.1-402.3 as shown in FIG. 4 is associated with respective RAT sets 404.1, 404.2, 404.3, 404.4, and 404.5. Moreover, the SIMs 402.1-402.3 and their respective RAT sets 404.1-404.5 also share (i.e., access at any particular time period) the single RF resource set 408. The single RF resource set 408 may be identified with the RF transceiver circuitry 308, for example, as shown in FIG. 3 and discussed with reference to the wireless device 300.

However, unlike the typical wireless devices 100, 200, as discussed herein with reference to FIGS. 1 and 2, respectively, the wireless device as shown in FIG. 4 includes SIMs 402.1 and 402.3 that support SRLTE/Hybrid CDMA operation. For instance, the SIMs 402.1 and 402.3 include separate RATs 404.1 and 404.4, which support PS operation, as well as RATs 404.2 and 404.5, which support both CS and PS operation. Continuing this example, although the RATs 404.2 and 404.5 may be able to perform both CS and PS operations (CSPS), the device as shown in FIG. 4 utilizes flow 400 such that, when SIMs 402.1 and 402.3 are operating in either an SRLTE or a hybrid CDMA mode, RATs 404.1 and 404.4, respectively, perform PS operations, while RATs 404.2 and 404.5, respectively, perform CS operations. Thus, the aspects described herein allow more than 1 RAT in each SIM to be virtually active at the same time during the SRLTE or hybrid CDMA mode, in which both the LTE or DO PS RAT and the CDMA 1× CS RAT are both concurrently active.

The SIM 402.2, on the other hand, may include any suitable 3GPP RAT set (e.g., GGE, UTRA, TDS, LTE), or a CDMA 1× may be present in the SIM 402.2, as shown in FIG. 4. Again, the flow 400 shown in FIG. 4 may be extended to include any suitable number of SIMs 402.1-402.N, with any subset of these SIMs 402.1-402.N being associated with different RAT combinations of SRLTE/Hybrid CDMA RATs and other 3GPP RATs. To facilitate the prioritization and conflict resolution of the access to the single RF resource set 408 via the different SIMs and RATs, aspects include flow 400 implementing the SCSPA block 406. Again, the SCSPA block 406 may be identified with the SRLTE/Hybrid CDMA prioritization module 306, which may be executed by the processor circuitry 302 to perform the functions represented by the SCSPA block 406.

In an aspect, the SCSPA block 406 is implemented to resolve single-Tx, single-Rx radio access to the single RF resource set 408 when an SRLTE/Hybrid CDMA system is present in one of the SIMs 402.1-402.N, as is the case illustrated in FIG. 4. To do so, the SCSPA block 406 functions to prioritize the RATs for the first SIM (e.g., SIM 402.1) according to its present operating mode (e.g., the present substate of communications). In an aspect, the SCSPA block 406 may prioritize the RAT for the first SIM in accordance with the RAT currently used by the SIM 402.1 at the time when the prioritization is made. Once the prioritization of RATs is made for the SIM 402.1, this process may be iteratively repeated for each remaining SIM by applying the prioritization scheme in accordance with each RATs mode of operation (substate) for each SIM, thus comparing each prioritized RAT for each of SIMs 402.1-402.N until a final (i.e., highest priority) chosen RAT and SIM is allowed access to the single RF resource set 408. The details regarding how this prioritization scheme is performed for each of SIMs 402.1-402.N in a wireless device is further discussed below with reference to FIGS. 5-6.

FIG. 5 illustrates a flow associated with a multi-SIM and multi RAT device with a shared RF resource implementing priority handling, in accordance with an aspect of the present disclosure. The flow 500 as shown in FIG. 5 may be identified with a more detailed view of the flow 400 as shown in FIG. 4. For instance, the flow 500 may be associated with a wireless device that includes any suitable number N of SIMs 502.1-502.N, which may be identified with the SIMs 1-N of the wireless device 300 as shown in FIG. 3 and the SIMs 402.1-402.N as shown in FIG. 4. Again, although only three SIMs 502.1-502.3 are shown in FIG. 5, the aspects described herein are applicable to any suitable number of SIMs. Furthermore, the SCSPA block 506 and the single RF resource set 508 as shown in FIG. 5 may be identified with the SCSPA block 406 and the single RF resource set 408 as shown in FIG. 4. Additional common components of flows 400 and 500 are not further described for purposes of brevity.

As shown in FIG. 5, the SCSPA block 506 provides a more detailed operational flow diagram of the SCSPA block 406 as shown in FIG. 4. As further discussed below, aspects include the SCSPA block 506 prioritizing the RATs from among each of SIMS 502.1-502.3 using a table that specifies a specific prioritization scheme based upon the particular operational substate of each RAT at the time access to the single RF resource set 508 is needed. For example, as discussed above, each SIM defines how its respective RAT(s) connect to a wireless communication network in accordance with a specific wireless communication protocol. As shown in FIG. 5, SIMs 1 and 3 include a PS RAT and a CSPS RAT, and therefore may operate in accordance with an SRLTE/Hybrid CDMA communication protocol. SIM 2, however, includes a single CSPS RAT, and therefore may operate in accordance with a different protocol as SIMs 1 and 3, such as a 3GPP communication protocol, for example.

Each of these communication protocols defines specific time-varying sub states that function as different operating phases. These time-varying substates may include, for example, time slots reserved for specific wireless connectivity functions, which may be associated with communications to or from the wireless device in which the flow 500 is implemented. For example, one time-varying substate may include a period of time in which a wireless device searches for a wireless network (e.g., a base station signal), another may include a time period in which the wireless device registers on a wireless network, and yet another may include the time period in which the wireless device is actually connected to a wireless network for voice and/or data communications. During ordinary use by a multimode wireless device, each communication protocol, and thus each SIM and RAT associated with that communication protocol, may require access to the single RF resource set 508 to perform the various functions defined by each of these various substates.

Because a multimode device is configured to operate using more than one communication protocol, there may be times when more than one RAT requires access to the single RF resource set 508. In some instances, if a RAT requires access to the single RF resource set 508 and does not obtain this access, the function associated with that particular substate when access is required cannot be completed, which may result in undesirable activity such as dropped calls, for example.

To address these issues, aspects include the SCSPA block 506 functioning as a universal and adaptable solution that resolves issues with CDMA RAT system access to the single RF resource set 508 when one or more RATs utilize SRLTE and/or hybrid CDMA 1λ/DO communication protocols in a multimode wireless device implementing multi-SIMs using 3GPP and/or 3GPP2. In an aspect, the SCSPA block 506 may function to initially detect when one of the SIMs 502.1-502.N is operating in SRLTE or hybrid CDMA 1λ/DO mode, and then reduce the PS RAT priority to arbitrate the single RF resource set 508 against the CDMA 1× CS RAT. In other words, aspects include the prioritization scheme executed via SCSPA block 506 being triggered upon detecting the presence of one of SIMs 502.1-502.N utilizing SRLTE and/or hybrid CDMA. In the event that a SRLTE and/or hybrid CDMA mode of operation is not detected, aspects include the SCSPA block 506 not being triggered. In such a case (i.e., when the wireless device is not operating in accordance with a SRLTE and/or hybrid CDMA mode of operation), the wireless device may implement any other suitable known methods to establish RAT priority that is implemented for 3GPP multimode wireless devices.

As further discussed below, aspects include the SCSPA block 506 implementing specific scenarios to overwrite priority functions, according to predetermined conditions such as the aforementioned substates, for example. In an aspect, the SCSPA block 506 functions to iteratively compare each SIM and RAT until a final selection is made based upon an established prioritization. For example, the selected RAT of an initial conflict resolution that is operating in SRLTE or hybrid CDMA mode (e.g., the RAT associated with SIM 502.1) is compared to a RAT associated with a second SIM (e.g., SIM 502.2), with no changes in its "winning" priority, as the LTE/DO RAT in an SRLTE/Hybrid CDMA system functions as a PS RAT. In aspects, the SCSPA block 506 may be extended to multiple SIMs that may contain SRLTE/Hybrid CDMA or 3GPP RATs, with the final selected (e.g., highest priority) RAT having exclusive access to the single RF resource set 508 for a certain period of time.

Figure 6:
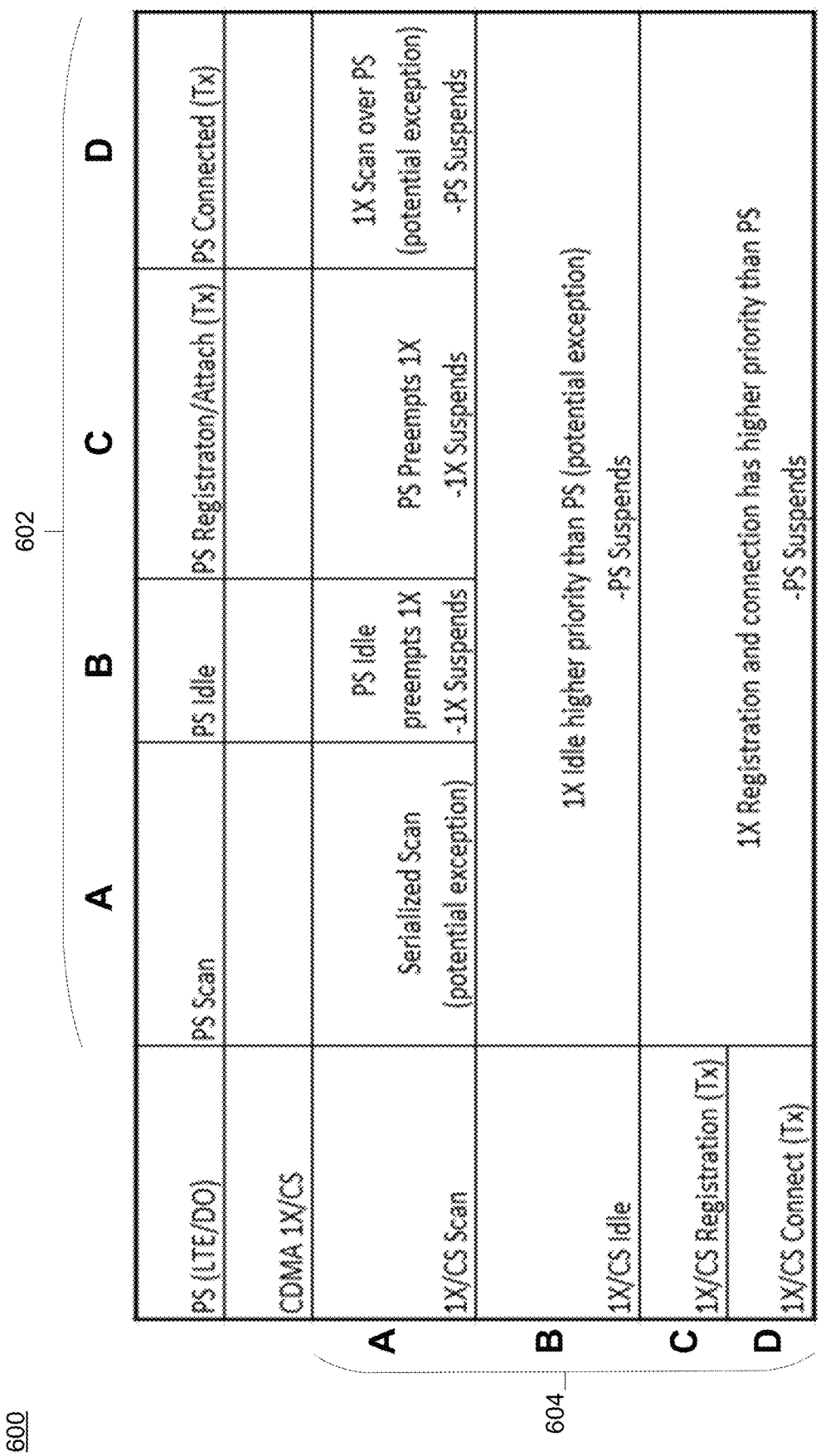
FIG. 6 illustrates a priority handling table, in accordance with an aspect of the disclosure.

In an aspect, the SCSPA block 506 may implement a substate-based prioritization scheme, which is summarized in the example priority handling table as shown in FIG. 6 and further discussed below, to remedy the aforementioned conflicts among the different communication protocols. For example, table 600 includes a set of communication substates arranged in a column format, with each intersecting row and column having a prioritization outcome based upon a comparison of a present communication substate for each RAT being compared.

For example, the table 600 defines a set of four predetermined substates 602 for LTE/DO (PS), which are labeled as columns A-D. Table 600 also includes a set of four predetermined substates 604 for CDMA 1× (CS), which are labeled as rows A-D. Examples of the communication substates are shown in table 600, and include, for the PS RAT(s) within the system, a PS scanning substate (602A), a PS idle substate (602B), a PS registration/attach substate (Tx) (602C), and a PS connected substate (Tx) (602D). Additional examples shown in table 600 include for the CS RAT(s) within the system, a CS scanning substate (604A), a CS idle substate (604B), a CS registration/attach substate (Tx) (604C), and a CS connected substate (Tx) (604D). Thus, aspects include the SCSPA block 506 comparing the substates of each RAT within the wireless device to identify a RAT priority based upon the intersection of PS substates 602A-D and CS substates 604A-D. For example, the table 600 defines prioritizations as a set of predefined rules as follows:

1. When 1× CS Scan (system acquisition) in (604A) conflicts with PS Scan (602A), then a serialized scan priority function will be generated. This rule is subject to additional exception handling rules, as further discussed below.

2. When 1× CS Scan (604A) conflicts with PS Idle wake (602B), a higher priority will be given to the PS RAT that already has system timing.

3. When 1× CS Scan (604A) conflicts with a PS registration or data attach (602C), the 1× CS scan will be suspended so that data attach can proceed without failure.

4. When 1× CS Scan (604A) conflicts with a PS connection (602D), a high priority 1× CS system lost scan will precede a PS RAT connection, but not low priority scans such as better system selection. This rule is subject to additional exception handling rules, as further discussed below.

5. All 1× CS Idle/paging procedures (604B) overrule (i.e., have a higher priority) than PS scan (602A), PS Idle (602B), PS Registration (602C), or PS Connected (602D) operations. This rule is subject to additional exception handling rules, as further discussed below. For example, certain (e.g., predefined) PS cases can suspend 1× Scan and Idle Handoffs (IdleHO).

6. All 1× CS registration (604C) and connection (604D) procedures that require both the transmitter (Tx) and single-Rx will have a higher priority and thus suspend the PS RAT (602A-D).

Again, aspects include the SCSPA block 506 being triggered upon detecting the presence of one of SIMs 502.1-502.N utilizing SRLTE and/or hybrid CDMA, which is represented in FIG. 5 as block 506.1. With continued reference to FIG. 5, and assuming that the SIM 502.1 is operating in accordance with a communication protocol that includes one of SRLTE or hybrid CDMA mode, block 506.1 may facilitate a prioritization among the PS RAT and the CS RAT utilized by the SIM 502.1. To do so, block 506.1 represents an overall functionality provided by the SCSPA block 506, which utilizes the example table 600 as shown in FIG. 6 to facilitate an initial priority comparison (block 506.2) and the priority exception handling (block 506.3), with the latter potentially changing the priority from the initial prioritization made via the initial priority comparison block 506.2 Of course, aspects include the SCSPA block 506 performing RAT prioritization in any suitable order or sequence. However, the example shown discussed herein of applying an initial prioritization in block 506.2, which is then subjected to an exception handling prioritization in block 506.3, is described herein in a sequential manner for ease of explanation.

In any event, aspects include the SCSPA block 506 initially assigning a priority level (when SRLTE or hybrid CMDA mode is detected) that is associated with each of the CS and PS RATs when comparing the 1× CS substates with LTE/DO substates in accordance with table 600 to determine single-Rx access within a single SIM (e.g., SIM 502.1). Continuing the example with the SIM 502.1 and the flow 500 shown in FIG. 5, the SCSPA block 506 may perform the prioritization such that two levels of priority are defined as follows, with the highest priority listed as Level 1:

1. Level 1: Priority_CSPS, which applies for all RATs which may be operated as CS or PS, including 1×CDMA.

2. Level 2: Priority_PS, which applies for the PS RATs in the single SIM under SRLTE/Hybrid CDMA mode in which the RATs are operating under PS (e.g., LTE and DO associated with the SIM 502.1, as shown in FIG. 5).

In an aspect, the PS priority is derived by a reduction function dependent on the RAT and current substate in which the RAT is operating (e.g., using the substate comparisons shown in table 600), which may be expressed in terms of example computer code as shown in block 506.1 as follows:

Priority_PS=f_reduce (Priority_CSPS, substate, RAT).

Continuing the example with reference to FIG. 5 and the SIM 502.1, aspects include block 506.1 prioritizing the PS RAT and the CS RAT associated with SIM 502.1, which may be operating in a SRLTE or hybrid CDMA communication protocol, via the set of rules discussed above with reference to table 600. Thus, the initial priority comparison block 506.2 may represent a "general" rule that is utilized by the SCSPA block 506 to derive an initial PS RAT and CS RAT prioritization via the comparison of PS and CS substates required or currently being implemented by each respective RAT, as shown by the set of rules represented in table 600.

However, aspects further include the SCSPA block 506 implementing any suitable number and/or type of additional conditions, scenarios, rules, etc., which may function to "override" the prioritization that is initially determined using the rules shown in table 600.

In an aspect, the priority exception handling block 506.3 may define an additional set of predetermined rules that modify those shown in the table 600. In other words, the priority exception handing block 506.3 may store, access, or otherwise indicate instances in which a priority "inversion" prevails over the "general" priority principles that would otherwise be determined from the application of the rules shown in table 600. In various aspects, these exceptions may be due to an outcome of desired experiences in field tests, special customer requirements, testing requirements, etc. Four such exceptions are indicated below, although these are provided as examples and not by way of limitation. Again, the exceptions may be of any suitable number and type such that the result of the prioritization scheme provides desired results.

Exception 1: PS Setup/Connected+1× Idle/Scan:

This exception is associated with the rule in table 600 for communication substates corresponding to a 1× CS Scan (604A) or a 1× CS Idle (604B), and the PS being connected (602D). In particular, aspects include the SCSPA block 506 providing an exception that is triggered when the PS RAT (LTE/DO) data setup/attachment or connection is preempted by 1× paging reception, 1× Idle Handoff, or a 1× scan for a certain period of time (e.g., a duration of time in excess of a threshold time period), which may cause data attachment to the packet data network to be lost. Thus, Exception 1 results in the PS priority being raised temporarily after a timeout period to overwrite the 1×RAT priority. This exception may be particularly useful, for example, to overcome field situations where weak signal conditions may extend the 1× CS Idle or 1× CS Scan procedures.

Exception 2: PS Connected+1× Scan:

This exception is also associated with the rule in table 600 for communication substates corresponding to a 1× CS scan (604A) and the PS being connected (602D). In an aspect, the exception may be triggered when the PS RAT is in a connected state, and the PS RAT is suspended for a certain period of time (e.g., a duration of time in excess of a threshold time period) by the 1× Scan. In such a case, Exception 2 may facilitate the use of a time interval pattern to scan several channels at a time, which allows the PS RAT connection to continue before the data connection is lost. Moreover, Exception 2 allows high priority scans to suspend a PS connection, whereas low priority scans will not be allowed to disturb the PS data connection. For example, "high" priority scans may be considered those that result from the CS 1× system being lost, and a recovery scan needs to occur urgently. To provide another example, "low" priority scans may be considered those that occur when the CS 1× system is already "camped" on a less-preferred system according to carrier deployment, and a "Better System" scan needs to occur to find a more preferred system on a carrier's home system list.

Exception 3: PS Special High Priority Procedures+1× Idle/Scan/Idlehandoff:

This exception is associated with the rule in table 600 for communication substates corresponding to a 1× CS Scan (604A) and a 1× CS Idle (604B). In particular, aspects include the SCSPA block 506 providing an exception that is triggered by the passage of a predetermined timeout period associated with the PS RAT's high priority emergency calls, registration, or mobility updates. When triggered, Exception 3 results in a temporary priority inversion to allow the PS RAT to access the single RF resource set 508, and suspend 1× Idle, Scan, or Idle handoff procedures that may occupy the single RF resource set 508 for a long time due to, for example, poor signal conditions.

Exception 4: PS Scan+1× Scan:

This exception is associated with the rule in table 600 for communication substates corresponding to a 1× CS Scan (604A) and a PS Scan (602A). In particular, aspects include the SCSPA block 506 providing an exception that is triggered by a 1× CS Scan (system acquisition) conflicting with a PS Scan. When triggered, Exception 4 results in a serialized scan priority pattern being generated, with 1× CS having a higher weighting, or chance for access to the single RF resource set 508. To provide an illustrative example, the serialized scan priority pattern may be represented over successive intervals of time as: 1λ, 1λ, 1λ, LTE/DO, 1λ, 1λ, 1λ, LTE/DO . . . etc. In other words, the "general" case is for the CS RAT to have priority access to the single RF resource set 508 under such conditions. However, Exception 4 functions generate a serialized scan that is weighted to favor access to the single RF resource set 508 by the CS RAT, although the PS RAT could still be granted access.

Again, aspects include the SCSPA block 506 performing a multi-stage priority comparison across each of the multiple SIMs 502.1-502.N. To do so, aspects include the SCSPA block 506 first resolving the priority conflict within the first SIM in which the SRLTE or Hybrid CDMA is present (e.g., SIM 502.1), using the priority reduction function as described above for the PS RAT. Once the CS RAT and the PS RAT for the SIM 502.1 have been prioritized in this manner, aspects include the SCSPA block 506 comparing the selected RAT (i.e., one of the CS RAT or the PS RAT with the highest priority) with the RAT in the next SIM, which is SIM 502.2 in the example shown in FIG. 5 (block 506.4). In an aspect, this comparison may be made in accordance with the same set of predetermined rules and exceptions applied to the SIM 502.1 to prioritize the CS RAT and the PS RAT (e.g., those associated with blocks 506.1, 506.2, and 506.3).

In other words, aspects include the SCSPA block 506 determining the highest priority RAT from the SIM 502.1 and the CSPS RAT of SIM 502.2 (block 506.4) by comparing the substates of each RAT using the set of predetermined rules as shown and discussed in table 600, and applying any relevant exceptions. Aspects include SCSPA block 506 repeating this process to distinguish among the various CS RAT and PS RAT priorities for each of SIMs 502.1-502.N (e.g., by applying blocks 506.5-506.N, with each block representing, for example, the priority comparison and exception rules as discussed above with reference to blocks 506.1-506.3), until a final SIM and RAT is selected (i.e., the RAT with the highest priority as determined by the SCSPA block 506). Again, this highest priority RAT is then given access to the single RF resource set 508 for a period of time. In an aspect, the SIMs and their respective RATs may be re-prioritized at any suitable time or in accordance with any suitable schedule, such as when a substate of one of the RATs changes, for example, thus triggering a re-prioritization of the RATs.

With continued reference to FIG. 5, aspects include the Priority_PS level identified by the SCSPA block 506 being retained when the first SIM (SIM 502.1) is compared with the subsequent SIMs and their respective RATs (e.g., SIMs 502.2-502.3) for access to the single RF resource set 508. For example, because the SRLTE or hybrid CDMA mode is present on the SIM 502.1, the LTE or DO RAT for SIM 502.1 operates solely as a PS RAT in SIM. 502.1. The RAT associated with SIM 502.2, on the other hand (e.g., GGE/UTRA/TDS/LTE, etc.), including the CDMA 1×RAT, are treated as Priority_CSPS as defined by the SCSPA block 506 as discussed above.

Because the CDMA 1×RAT is treated as Priority_CSPS in this way, there are some cases in which the prioritization scheme utilized by the SCSPA block 506 may result in one or more SIMs having equal priority, or equal access to the single RF resource set 508. To provide an illustrative example using the SIMs 502.1 and 502.2 as shown in FIG. 5, in the event that the CS RAT from SIM 502.1 has the highest priority and is thus selected first, the comparison for access priority to the single RF resource set 508 would be between equal priority RATs from among SIMs 502.1 and 502.2. In such a case, aspects include the SCSPA block 506 implementing a round robin selection scheme such that the wireless device in which flow 500 is executed allows for equal probability of success among the RATs to access the single RF resource set 508. Again, this occurs because the other RATs that are not operating in accordance with SRLTE or hybrid CDMA communication protocol (e.g., 502.2) may function both as a CS and PS system. In aspects, such a round robin selection scheme may be applied to any suitable number N of the multiple SIMs 502.1-502.N having equal priority in this manner.

Because a multimode device may implement more than one SIM that is configured to operate in accordance with SRLTE or hybrid CDMA, aspects include the SCSPA block 506 being applied to such systems. To do so, aspects include the SCSPA block 506 being applied to each SIM configured to operate in accordance with SRLTE or hybrid CDMA communication protocols. For example, as shown in an example in FIG. 5, SIMs 502.1 and 502.3 are each configured to support SRLTE and/or hybrid CDMA. Therefore, aspects include the SCSPA block 506 comparing priority across each SIM and RAT using the same principles described above with respect to the prioritization of the CS RAT and the PS RAT associated with SIM 502.1 and the CSPS RAT associated with SIM 502.2. In other words, the SCSPA block 506 may implement the predetermined rules according to the table 600 and any applicable exceptions to the PS RAT and the CS RAT associated with SIM 502.3 (block 506.5). Then, the SCSPA block 506 may continue to compare the outcome of the highest priority RAT identified in this manner (block 506.6) to the highest priority RAT identified from the previous comparison (block 506.4). Again, this process may be repeated any suitable number of times such that any suitable number of SIMs and RATs may be supported.

Examples

The following examples pertain to further aspects.

Example 1 is a device, comprising: a radio frequency (RF) resource set configured to facilitate wireless communications for the device; a first subscriber identity module (SIM) configured to support a packet-service (PS) radio access technology (RAT) and a circuit-service (CS) RAT, the PS RAT and the CS RAT operating within one or more time-varying PS and CS communication substates, respectively, in accordance with a first communication protocol; and one or more processors configured to selectively assign a priority to the PS RAT and the CS RAT based upon a comparison of a current PS communication substate to a current CS communication substate from among the time-varying PS and CS communication substates that are associated with the CS RAT and the PS RAT, respectively, and to allow one of the PS RAT or the CS RAT access to the RF resource in accordance with the assigned priority.

In Example 2, the subject matter of Example 1, comprising: a second SIM configured to support a CSPS RAT operating within one or more CSPS time-varying communication substates in accordance with a second communication protocol, wherein the one or more processors are further configured to assign a priority to each of the PS RAT, the CS RAT, and the CSPS RAT based upon a comparison of the current PS communication substate, the current PS communication substate, and a current CSPS substate, and to allow one of the PS RAT, the CS RAT, or the CSPS RAT access to the RF resource in accordance with the assigned priority.

In Example 3, the subject matter of one or more of Examples 1 and 2, wherein the first communication protocol includes a single radio long term evolution (SRLTE) protocol.

In Example 4, the subject matter of one or more of Examples 1-3, wherein the first communication protocol includes a hybrid code division multiple access (CDMA) protocol.

In Example 5, the subject matter of one or more of Examples 1-4, wherein the one or more processors are configured to detect operation of the device in accordance with the first communications protocol, and to assign the priority to the PS RAT and the CS RAT when operation of the device in accordance with the first communication protocol is detected.

In Example 6, the subject matter of one or more of Examples 1-5, wherein the one or more processors are configured to assign the priority to the PS RAT and the CS RAT utilizing a predetermined set of rules that identifies, for each combination of the time-varying PS and CS communication substates associated with the CS RAT and the PS RAT, respectively, the CS RAT or the PS RAT as being a higher priority.

In Example 7, the subject matter of one or more of Examples 1-6, wherein the time-varying PS communication substates include one or more of: a PS scanning substate; a PS idle substate; a PS registration/attach substate; and a PS connected substate.

In Example 8, the subject matter of one or more of Examples 1-7, wherein the time-varying CS communication substates include one or more of: a CS scanning substate; a CS idle substate; a CS registration/attach substate; and a CS connected substate.

Example 9 is a device, comprising: a plurality of subscriber identity modules (SIM), a first subset of the plurality of SIMs being configured to support a packet-service (PS) radio access technology (RAT) and a circuit-service (CS) RAT as defined by a first cellular communication protocol, and a second subset of the plurality of SIMs being configured to support a CSPS RAT as defined by a second cellular communication protocol; and one or more processors configured to iteratively compare a current communication substate of one or more of the PS RATs, the CS RATs, and the CSPS RATs associated with the plurality of SIMs, to prioritize each SIM from among the plurality of SIMs based upon the comparison of current communication substates, and to allow a SIM from among the plurality of SIMs having the highest priority access to a single RF resource that is shared among each of the plurality of SIMs using one of a PS RAT, a CS RAT, or a CSPS RAT.

In Example 10, the subject matter of Example 9, wherein the communication substate of one or more of the PS RATs, CS RATs, and CSPS RATs are time-varying communication substates in accordance with one of the first cellular communication protocol or the second cellular communication protocol.

In Example 11, the subject matter of one or more of Examples 9 and 10, wherein the first cellular communication protocol includes one of a single radio long term evolution (SRLTE) protocol or a hybrid code division multiple access (CDMA) protocol.

In Example 12, the subject matter of one or more of Examples 9-11, wherein the one or more processors are configured to prioritize each SIM from among the plurality of SIMs by utilizing a predetermined set of rules that identifies, for each combination of communication substates associated with the CS RATs and the PS RATs among the first subset of the plurality of SIMs, one of the CS RAT or the PS RAT as being a higher priority.

In Example 13, the subject matter of one or more of Examples 9-12, wherein the one or more processors are configured to iteratively compare a current communication substate of one or more of the PS RATs, CS RATs, and CSPS RATs by comparing a higher prioritized one of a CS RAT or a PS RAT among the first subset of the plurality of SIMs to a CSPS RAT among the second subset of the plurality of SIMs.

In Example 14, the subject matter of one or more of Examples 9-13, wherein the one or more processors are configured to, when a result of comparing a current communication substate of a CS RAT and a PS RAT among the first subset of the plurality of SIM results in the CS RAT having a higher priority than the PS RAT, prioritizing the remaining SIMs from among the plurality of SIMs by applying a round robin selection scheme to schedule access for a RAT associated with each respective one of the plurality of SIMs to the single RF resource.

In Example 15, the subject matter of one or more of Examples 9-14, wherein a communication substate associated with the one or more PS RATs includes one or more of: a PS scanning substate; a PS idle substate; a PS registration/attach substate; and a PS connected substate.

In Example 16, the subject matter of one or more of Examples 9-15, wherein a communication substate associated with the one or more CS RATs includes one or more of: a CS scanning substate; a CS idle substate; a CS registration/attach substate; and a CS connected substate.

Example 17 is a non-transitory computer readable medium having instructions stored thereon that, when executed by one or more processors, cause the one or more processors to: operate a wireless communication device using a first SIM that supports packet-service (PS) radio access technology (RAT) and circuit-service (CS) RAT, the PS RAT and the CS RAT operating within one or more time-varying PS and CS communication substates, respectively, in accordance with a first communications protocol, operate the wireless communication device using a second SIM that supports a CSPS RAT, the CSPS RAT operating within one or more time-varying CSPS communication substates in accordance with a second communications protocol, and selectively assign a priority to each of the PS RAT, the CS RAT, and the CSPS RAT based upon a comparison of a current PS communication substate, a current CS communication substate, and a current CSPS communication substate from among the time-varying PS, CS, and CSPS communication substates that are associated with the PS RAT, the CS RAT, and the CSPS RAT, respectively, and to allow one of the PS RAT, the CS RAT, or the CSPS RAT access to a single RF resource that is shared among the first SIM and the second SIM based upon the assigned priority.

In Example 18, the subject matter of Example 17, wherein the first communication protocol includes a single radio long term evolution (SRLTE) protocol.

In Example 19, the subject matter of one or more of Examples 17-18, wherein the first communication protocol includes a hybrid code division multiple access (CDMA) protocol.

In Example 20, the subject matter of one or more of Examples 17-19, further including instructions that, when executed by the one or more processors, cause the one or more processors to trigger the selective assignment of the priority of each of the PS RAT, the CS RAT, and the CSPS RAT upon detecting operation of the wireless device using the first communication protocol that includes one of a single radio long term evolution (SRLTE) SRLTE protocol or a hybrid code division multiple access (CDMA) protocol.

In Example 21, the subject matter of one or more of Examples 17-20, further including instructions that, when executed by the one or more processors, cause the one or more processors to assign a priority to each of the PS RAT, the CS RAT, and the CSPS RAT utilizing a predetermined set of rules that identifies, for each combination of the time-varying PS and CS communication substates associated with the CS RAT and the PS RAT, respectively, the CS RAT or the PS RAT as being a higher priority.

In Example 22, the subject matter of one or more of Examples 17-21, wherein the time-varying PS communication substates include one or more of: a PS scanning substate; a PS idle substate; a PS registration/attach substate; and a PS connected substate.

In Example 23, the subject matter of one or more of Examples 17-22, wherein the time-varying CS communication substates include one or more of: a CS scanning substate;
a CS idle substate; a CS registration/attach substate; and a CS connected substate.

Example 24 is a device, comprising: a radio frequency (RF) resource set means for facilitating wireless communications for the device; a first subscriber identity module (SIM) means for supporting a packet-service (PS) radio access technology (RAT) means and a circuit-service (CS) RAT means, the PS RAT means and the CS RAT means operating within one or more time-varying PS and CS communication substates, respectively, in accordance with a first communication protocol; and one or more processor means for selectively assigning a priority to the PS RAT means and the CS RAT means based upon a comparison of a current PS communication substate to a current CS communication substate from among the time-varying PS and CS communication substates that are associated with the CS RAT means and the PS RAT means, respectively, and to allow one of the PS RAT means or the CS RAT means access to the RF resource means in accordance with the assigned priority.

In Example 25, the subject matter of Example 24, comprising: a second SIM means for supporting a CSPS RAT means for operating within one or more CSPS time-varying communication substates in accordance with a second communication protocol, wherein the one or more processor means assign a priority to each of the PS RAT means, the CS RAT means, and the CSPS RAT means based upon a comparison of the current PS communication substate, the current PS communication substate, and a current CSPS substate, and allow one of the PS RAT means, the CS RAT means, or the CSPS RAT means access to the RF resource means in accordance with the assigned priority.

In Example 26, the subject matter of one or more of Examples 24 and 25, wherein the first communication protocol includes a single radio long term evolution (SRLTE) protocol.

In Example 27, the subject matter of one or more of Examples 24-26, wherein the first communication protocol includes a hybrid code division multiple access (CDMA) protocol.

In Example 28, the subject matter of one or more of Examples 24-27, wherein the one or more processor means detects operation of the device in accordance with the first communications protocol, and assigns the priority to the PS RAT means and the CS RAT means when operation of the device in accordance with the first communication protocol is detected.

In Example 29, the subject matter of one or more of Examples 24-28, wherein the one or more processor means assigns the priority to the PS RAT means and the CS RAT means utilizing a predetermined set of rules that identifies, for each combination of the time-varying PS and CS communication substates associated with the CS RAT means and the PS RAT means, respectively, the CS RAT means or the PS RAT means as being a higher priority.

In Example 30, the subject matter of one or more of Examples 24-29, wherein the time-varying PS communication substates include one or more of: a PS scanning substate; a PS idle substate; a PS registration/attach substate; and a PS connected substate.

In Example 31, the subject matter of one or more of Examples 24-30, wherein the time-varying CS communication substates include one or more of: a CS scanning substate; a CS idle substate; a CS registration/attach substate; and a CS connected substate.

Example 32 is a device, comprising: a plurality of subscriber identity modules (SIM) means, a first subset of the plurality of SIM means supporting a packet-service (PS) radio access technology (RAT) means and a circuit-service (CS) RAT means as defined by a first cellular communication protocol, and a second subset of the plurality of SIM means supporting a CSPS RAT means as defined by a second cellular communication protocol; and one or more processor means for iteratively comparing a current communication substate of one or more of the PS RAT means, the CS RAT means, and the CSPS RAT means associated with the plurality of SIM means, for prioritizing each SIM means from among the plurality of SIM means based upon the comparison of current communication substates, and allowing a SIM means from among the plurality of SIM means having the highest priority access to a single RF resource means shared among each of the plurality of SIM means using one of a PS RAT means, a CS RAT means, or a CSPS RAT means.

In Example 33, the subject matter of Example 32, wherein the communication substate of one or more of the PS RAT means, CS RAT means, and CSPS RAT means are time-varying communication substates in accordance with one of the first cellular communication protocol or the second cellular communication protocol.

In Example 34, the subject matter of one or more of Examples 32 and 33, wherein the first cellular communication protocol includes one of a single radio long term evolution (SRLTE) protocol or a hybrid code division multiple access (CDMA) protocol.

In Example 35, the subject matter of one or more of Examples 32-34, wherein the one or more processor means prioritize each SIM means from among the plurality of SIM means by utilizing a predetermined set of rules that identifies, for each combination of communication substates associated with the CS RAT means and the PS RAT means among the first subset of the plurality of SIM means, one of the CS RAT means or the PS RAT means as being a higher priority.

In Example 36, the subject matter of one or more of Examples 32-35, wherein the one or more processor means iteratively compare a current communication substate of one or more of the PS RAT means, CS RAT means, and CSPS RAT means by comparing a higher prioritized one of a CS RAT means or a PS RAT means among the first subset of the plurality of SIM means to a CSPS RAT means among the second subset of the plurality of SIM means.

In Example 37, the subject matter of one or more of Examples 32-36, wherein the one or more processor means, when a result of comparing a current communication substate of a CS RAT means and a PS RAT means among the first subset of the plurality of SIM means results in the CS RAT means having a higher priority than the PS RAT means, prioritizing the remaining SIM means from among the plurality of SIM means by applying a round robin selection scheme to schedule access for a RAT means associated with each respective one of the plurality of SIM means to the single RF resource means.

In Example 38, the subject matter of one or more of Examples 32-37, wherein a communication substate associated with the one or more PS RAT means includes one or more of: a PS scanning substate; a PS idle substate; a PS registration/attach substate; and a PS connected substate.

In Example 39, the subject matter of one or more of Examples 32-38, wherein a communication substate associated with the one or more CS RATs includes one or more of: a CS scanning substate; a CS idle substate; a CS registration/attach substate; and a CS connected substate.

Example 40 is a non-transitory computer readable medium means having instructions stored thereon that, when executed by one or more processor means, cause the one or more processor means to: operate a wireless communication device means using a first SIM means that supports packet-service (PS) radio access technology (RAT) means and circuit-service (CS) RAT means, the PS RAT means and the CS RAT means operating within one or more time-varying PS and CS communication substates, respectively, in accordance with a first communications protocol, operate the wireless communication device using a second SIM means that supports a CSPS RAT means, the CSPS RAT means operating within one or more time-varying CSPS communication substates in accordance with a second communications protocol, and selectively assign a priority to each of the PS RAT means, the CS RAT means, and the CSPS RAT means based upon a comparison of a current PS communication substate, a current CS communication substate, and a current CSPS communication substate from among the time-varying PS, CS, and CSPS communication substates that are associated with the PS RAT means, the CS RAT means, and the CSPS RAT means, respectively, and to allow one of the PS RAT means, the CS RAT means, or the CSPS RAT means access to a single RF resource means that is shared among the first SIM means and the second SIM means based upon the assigned priority.

In Example 41, the subject matter of Example 40, wherein the first communication protocol includes a single radio long term evolution (SRLTE) protocol.

In Example 42, the subject matter of one or more of Examples 40-41, wherein the first communication protocol includes a hybrid code division multiple access (CDMA) protocol.

In Example 43, the subject matter of one or more of Examples 40-42, further including instructions that, when executed by the one or more processor means, cause the one or more processor means to trigger the selective assignment of the priority of each of the PS RAT means, the CS RAT means, and the CSPS RAT means upon detecting operation of the wireless device means using the first communication protocol that includes one of a single radio long term evolution (SRLTE) SRLTE protocol or a hybrid code division multiple access (CDMA) protocol.

In Example 44, the subject matter of one or more of Examples 40-43, further including instructions that, when executed by the one or more processor means, cause the one or more processor means to assign a priority to each of the PS RAT means, the CS RAT means, and the CSPS RAT means utilizing a predetermined set of rules that identifies, for each combination of the time-varying PS and CS communication substates associated with the CS RAT means and the PS RAT means, respectively, the CS RAT means or the PS RAT means as being a higher priority.

In Example 45, the subject matter of one or more of Examples 40-44, wherein the time-varying PS communication substates include one or more of: a PS scanning substate; a PS idle substate; a PS registration/attach substate; and a PS connected substate.

In Example 46, the subject matter of one or more of Examples 40-45, wherein the time-varying CS communication substates include one or more of: a CS scanning substate; a CS idle substate; a CS registration/attach substate; and a CS connected substate.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the 802.11 protocols (e.g., Wi-Fi and WiGig), and can be applied to other wireless protocols, including (but not limited to) Bluetooth, Near-field Communication (NFC) (ISO/IEC 18092), ZigBee (IEEE 802.15.4), Radio-frequency identification (RFID), and/or other wireless protocols as would be understood by one of ordinary skill in the relevant arts. Further, exemplary aspects are not limited to the above wireless protocols and can be used or implemented in one or more wired networks using one or more well-known wired specifications and/or protocols.

What is claimed is:

1. A device, comprising:
a first subscriber identity module (SIM) configured to support a packet-service (PS) radio access technology (RAT) and a circuit-service and a first packet-service (CSPS) RAT, the PS RAT and the first CSPS RAT operating within one or more time-varying communication substates, respectively, in accordance with a first communication protocol; and
one or more processors configured to selectively assign a priority to the PS RAT and the first CSPS RAT based upon a comparison of a current PS communication substate of the PS RAT to a current CS communication substate of the first CSPS RAT from among the time-varying communication substates that are associated with the PS RAT and the first CSPS RAT, respectively, and to allow one of the PS RAT or the first CSPS RAT access to an RF resource in accordance with the assigned priority,
wherein the selective assignment of the priority to the PS RAT and the first CSPS RAT is performed (i) in accordance with a first prioritization scheme when the first SIM is not operating in one of a Single-Radio Long Term Evolution (SRLTE) or a hybrid Code-Division Multiple Access (CDMA) mode, and (ii) in accordance with a second prioritization scheme when the first SIM is operating in one of a SRLTE or a hybrid CDMA mode in which the current PS communication substate and the current CS communication substate are associated with concurrently active states of the PS RAT and the first CSPS RAT, respectively,
wherein the first prioritization scheme is different than the second prioritization scheme, and
wherein the comparison of the current PS communication substate of the PS RAT to the current CS communication substate of the first CSPS RAT respectively, includes a comparison of one of several operating phases associated with PS communications in accordance with one of SRLTE or a hybrid CDMA mode for the PS RAT with one of several operating phases associated with CS communications in accordance with one of SRLTE or a hybrid CDMA mode for the first CSPS RAT.

2. The device of claim 1, comprising:
a second SIM configured to support a second circuit-service and a packet-service (CSPS) RAT operating within one or more CSPS time-varying communication substates in accordance with a second communication protocol,
wherein the one or more processors are further configured to assign a priority to each of the PS RAT, the first CSPS RAT, and the second CSPS RAT based upon a comparison of the current PS communication substate, the current CS communication substate, and a current CSPS communication substate that are associated with the PS RAT, the first CSPS RAT, and the second CSPS RAT, respectively, and to allow one of the PS RAT, the first CSPS RAT, or the second CSPS RAT access to the RF resource in accordance with the assigned priority.

3. The device of claim 1, wherein the first communication protocol includes a single radio long term evolution (SRLTE) protocol.

4. The device of claim 1, wherein the first communication protocol includes a hybrid code division multiple access (CDMA) protocol.

5. The device of claim 1, wherein the one or more processors are configured to detect operation of the device in accordance with the first communications protocol, and to assign the priority to the PS RAT and the first CSPS RAT when operation of the device in accordance with the first communication protocol is detected.

6. The device of claim 1, wherein the one or more processors are configured to assign the priority to the PS RAT and the first CSPS RAT utilizing a predetermined set of rules that identifies, for each combination of the time-varying communication substates associated with the PS RAT and the first CSPS RAT, respectively, the PS RAT or the first CSPS RAT as being a higher priority.

7. The device of claim 1, wherein the current PS communication substates include one or more of:
  a PS scanning substate;
  a PS idle substate;
  a PS registration/attach substate; and
  a PS connected substate.

8. The device of claim 1, wherein the current CS communication substates include one or more of:
  a CS scanning substate;
  a CS idle substate;
  a CS registration/attach substate; and
  a CS connected substate.

9. The device of claim 1, wherein the second prioritization scheme is based upon a reduction function that is dependent upon the comparison of the current PS communication substate of the PS RAT to the current CS communication substate of the CSPS RAT respectively.

10. A device, comprising:
  a plurality of subscriber identity modules (SIM), a first subset of the plurality of SIMs being configured to support a packet-service (PS) radio access technology (RAT) and a first circuit-service packet-service (CSPS) RAT as defined by a first cellular communication protocol, and a second subset of the plurality of SIMs being configured to support a second CSPS RAT as defined by a second cellular communication protocol; and
  one or more processors configured to iteratively compare a current communication substate of one or more of the PS RATs, the first CSPS RATs, and the second CSPS RATs associated with the plurality of SIMs to prioritize each SIM from among the plurality of SIMs based upon the comparison of current communication substates thereof, and to allow a SIM from among the plurality of SIMs having the highest priority access to a single RF resource that is shared among each of the plurality of SIMs,
  wherein the prioritization of each SIM from among the plurality of SIMs is performed (i) in accordance with a first prioritization scheme when at least one of the plurality of SIMs is not operating in one of a Single-Radio Long Term Evolution (SRLTE) or a hybrid Code-Division Multiple Access (CDMA) mode, and (ii) in accordance with a second prioritization scheme when none of the plurality of SIMs is operating in one of a SRLTE or a hybrid CDMA mode in which a current PS communication substate and a current CS communication substate are associated with concurrently active states of the PS RAT and the CS RAT, respectively,
  wherein the first prioritization scheme is different than the second prioritization scheme, and
  wherein the iterative comparison of the current communication substate of the one or more of the PS RATs, the first CSPS RATs, and the second CSPS RATs includes an iterative comparison of one of several operating phases associated with PS communications in accordance with one of SRLTE or a hybrid CDMA mode for the PS RATs with one of several operating phases associated with CS communications in accordance with one of SRLTE or a hybrid CDMA mode for the first CSPS RATs.

11. The device of claim 10, wherein the communication substate of one or more of the PS RATs, first CSPS RATs, and second CSPS RATs are time-varying communication substates in accordance with one of the first cellular communication protocol or the second cellular communication protocol.

12. The device of claim 10, wherein the first cellular communication protocol includes one of a single radio long term evolution (SRLTE) protocol or a hybrid code division multiple access (CDMA) protocol.

13. The device of claim 10, wherein the one or more processors are configured to prioritize each SIM from among the plurality of SIMs by utilizing a predetermined set of rules that identifies, for each combination of communication substates associated with the PS RATs and the first CSPS RATs among the first subset of the plurality of SIMs, one of the PS RAT or the first CSPS RAT as being a higher priority.

14. The device of claim 10, wherein the one or more processors are configured to iteratively compare a current communication substate of one or more of the PS RATs, the first CSPS RATs, and the second CSPS RATs by comparing a higher prioritized one of a PS RAT or a first CSPS RAT among the first subset of the plurality of SIMs to a second CSPS RAT among the second subset of the plurality of SIMs.

15. The device of claim 10, wherein the one or more processors are configured to, when a result of comparing a current communication substate of a PS RAT and a first CSPS RAT among the first subset of the plurality of SIM results in the PS RAT having a higher priority than the first CSPS RAT, prioritizing the remaining SIMs from among the plurality of SIMs by applying a round robin selection scheme to schedule access for a RAT associated with each respective one of the plurality of SIMs to the single RF resource.

16. The device of claim 10, wherein a communication substate associated with the one or more PS RATs includes one or more of:
  a PS scanning substate;
  a PS idle substate;
  a PS registration/attach substate; and
  a PS connected substate.

17. The device of claim 10, wherein a communication substate associated with the one or more first CSPS RATs includes one or more of:
  a CS scanning substate;
  a CS idle substate;
  a CS registration/attach substate; and
  a CS connected substate.

18. A non-transitory computer readable medium having instructions stored thereon that, when executed by one or more processors, cause the one or more processors to:
  operate a wireless communication device using a first SIM that supports packet-service (PS) radio access technology (RAT) and circuit-service and a first packet-service (CSPS) RAT, the PS RAT and the first CSPS RAT operating within one or more time-varying communication substates, respectively, in accordance with a first communications protocol,
  operate the wireless communication device using a second SIM that supports a second circuit-service and a packet-service (CSPS) RAT, the second CSPS RAT operating within one or more time-varying communication substates in accordance with a second communications protocol, and selectively assign a priority to each of the PS RAT, the first CSPS RAT, and the second CSPS RAT based upon a comparison of a current PS communication substate, a current CS communication substate, and a current CSPS communication substate from among the time-varying communication substates that are associated with the PS RAT, the first CSPS RAT, and the second CSPS RAT, respectively, and to allow one of the PS RAT, the first CSPS RAT, or the second CSPS RAT access to a single RF resource that is shared among the first SIM and the second SIM based upon the assigned priority, wherein the selective assignment of the priority is performed (i) in accordance with a first prioritization scheme when the first SIM is not operating in one of a Single-Radio Long Term Evolution (SRLTE) or a hybrid Code-Division Multiple Access (CDMA) mode, and (ii) in accordance with a second prioritization scheme when the first SIM is operating in one of a SRLTE or a hybrid CDMA mode in which the current PS communication substate of the PS RAT and the current CS communication substate of the first CSPS RAT are associated with concurrently active states of the PS RAT and the first CSPS RAT, respectively, wherein the first prioritization scheme is different than the second prioritization scheme, and wherein the comparison of the current PS communication substate of the PS RAT to the current CS communication substate of the first CSPS RAT respectively, includes a comparison of one of several operating phases associated with PS communications in accordance with one of SRLTE or a hybrid CDMA mode for the PS RAT with one of several operating phases associated with CS communications in accordance with one of SRLTE or a hybrid CDMA mode for the first CSPS RAT.

19. The non-transitory computer readable medium of claim 18, wherein the first communication protocol includes a single radio long term evolution (SRLTE) protocol.

20. The non-transitory computer readable medium of claim 18, wherein the first communication protocol includes a hybrid code division multiple access (CDMA) protocol.

21. The non-transitory computer readable medium of claim 18, further including instructions that, when executed by the one or more processors, cause the one or more processors to trigger the selective assignment of the priority of each of the PS RAT, the first CSPS RAT, and the second CSPS RAT upon detecting operation of the wireless device using the first communication protocol that includes one of a single radio long term evolution (SRLTE) SRLTE protocol or a hybrid code division multiple access (CDMA) protocol.

22. The non-transitory computer readable medium of claim 18, further including instructions that, when executed by the one or more processors, cause the one or more processors to assign a priority to each of the PS RAT, the first CSPS RAT, and the second CSPS RAT utilizing a predetermined set of rules that identifies, for each combination of the time-varying PS and CS communication substates associated with the PS RAT and the first CSPS RAT, respectively, the PS RAT or the first CSPS RAT as being a higher priority.

23. The non-transitory computer readable medium of claim 18, wherein the current PS communication substates include one or more of:
- a PS scanning substate;
- a PS idle substate;
- a PS registration/attach substate; and
- a PS connected substate.

24. The non-transitory computer readable medium of claim 18, wherein the current CS communication substates include one or more of:
- a CS scanning substate;
- a CS idle substate;
- a CS registration/attach substate; and
- a CS connected substate.

* * * * *